(12) United States Patent
Liao et al.

(10) Patent No.: US 11,949,230 B2
(45) Date of Patent: Apr. 2, 2024

(54) HYBRID POWER LOCOMOTIVE AND ENERGY BALANCE CONTROL METHOD AND SYSTEM THEREOF

(71) Applicant: CRRC ZHUZHOU LOCOMOTIVE CO., LTD., Hunan (CN)

(72) Inventors: Hongtao Liao, Hunan (CN); Wei Wang, Hunan (CN); Qingmin Qin, Hunan (CN); Zhe Chen, Hunan (CN); Qiang Fu, Hunan (CN)

(73) Assignee: CRRC ZHUZHOU LOCOMOTIVE CO., LTD., Hunan (CN)

(*) Notice: Subject to any disclaimer, the term of this patent is extended or adjusted under 35 U.S.C. 154(b) by 0 days.

(21) Appl. No.: 17/927,673

(22) PCT Filed: Nov. 18, 2020

(86) PCT No.: PCT/CN2020/129764
§ 371 (c)(1),
(2) Date: Nov. 23, 2022

(87) PCT Pub. No.: WO2021/238101
PCT Pub. Date: Dec. 2, 2021

(65) Prior Publication Data
US 2023/0178981 A1 Jun. 8, 2023

(30) Foreign Application Priority Data
May 29, 2020 (CN) .......................... 202010473877.8

(51) Int. Cl.
*H02J 1/10* (2006.01)
*B60L 50/61* (2019.01)
(Continued)

(52) U.S. Cl.
CPC .............. *H02J 1/106* (2020.01); *B60L 50/61* (2019.02); *B61C 3/02* (2013.01); *B61C 17/06* (2013.01);
(Continued)

(58) Field of Classification Search
CPC ........... B60L 50/61; B61C 3/02; H02J 7/1446
(Continued)

(56) References Cited

U.S. PATENT DOCUMENTS

| 2008/0309094 | A1* | 12/2008 | Molen .................... F02D 41/021 290/40 C |
| 2014/0033945 | A1 | 2/2014 | Foege et al. |
| 2021/0023961 | A1* | 1/2021 | Kiyohiro .................... H02J 7/16 |

FOREIGN PATENT DOCUMENTS

| CN | 202080279 U | 12/2011 |
| CN | 105857320 A | 8/2016 |

(Continued)

OTHER PUBLICATIONS

International Search Report issued in International Application No. PCT/CN2020/129764 dated Feb. 25, 2021, 3 pages.

*Primary Examiner* — Daniel Kessie
*Assistant Examiner* — Dru M Parries
(74) *Attorney, Agent, or Firm* — Maschoff Brennan; Michael Mauriel

(57) ABSTRACT

A hybrid power locomotive and an energy balance control method and system thereof is disclosed. In embodiments of the disclosure, the energy utilization rate is maximized by means of self-adaptive matching of the rotating speed and the power, dynamic balance control over the actual output voltage of the power pack is achieved by means of charging and discharging control over the energy storage element, and energy waste and power pack overload are avoided.

6 Claims, 1 Drawing Sheet

(51) Int. Cl.
  *B61C 3/02*      (2006.01)
  *B61C 17/06*     (2006.01)
  *H02J 7/00*      (2006.01)
  *H02J 7/14*      (2006.01)
  *H02P 9/02*      (2006.01)
  *H02P 101/40*    (2015.01)

(52) U.S. Cl.
  CPC ........ *H02J 7/00712* (2020.01); *H02J 7/1446* (2013.01); *H02P 9/02* (2013.01); *B60L 2200/26* (2013.01); *H02J 2310/48* (2020.01); *H02P 2101/40* (2015.01)

(58) Field of Classification Search
  USPC ........................................................ 307/9.1
  See application file for complete search history.

(56) References Cited

FOREIGN PATENT DOCUMENTS

| CN | 107150695 A | 9/2017 |
|----|-------------|--------|
| CN | 107776416 A | 3/2018 |
| CN | 107839700 A | 3/2018 |
| CN | 111038332 A | 4/2020 |
| CN | 111703443 A | 9/2020 |

\* cited by examiner

HYBRID POWER LOCOMOTIVE AND ENERGY BALANCE CONTROL METHOD AND SYSTEM THEREOF

CROSS REFERENCE TO RELATED APPLICATIONS

This application is a U.S. National Phase application under 35 U.S.C. § 371 of International Application No. PCT/CN2020/129764 filed on Nov. 18, 2020 and claims priority to Chinese Application No. 202010473877.8 filed on May 29, 2020.

FIELD OF THE INVENTION

The present invention belongs to the technical field of hybrid power control, and in particular relates to a hybrid power locomotive and an energy balance control method and system thereof.

BACKGROUND OF THE INVENTION

In recent years, countries around the world have continued to deepen their research on new types of rail transit vehicles. The US Department of Transportation, Germany's Siemens Group and Canada's Bombardier Group successively proposed the idea of diesel-electric EMUs, that is, a high-power diesel engine is combined with an energy storage element to form a hybrid power system, and a diesel generator set (also known as an internal combustion power pack) and an energy storage system are used simultaneously to provide traction during acceleration of the vehicle, as shown in FIG. 1. The power pack may be a diesel generator set or a synchronous generator set.

In the existing hybrid power locomotive, when the electric energy generated by some power packs is transmitted to an intermediate DC circuit, a voltage of the intermediate DC circuit will fluctuate with the load. In order to meet the requirement of discharge of the energy storage element, the voltage of the intermediate DC circuit often increases greatly. The rotating speed of the power pack is generally controlled to save energy. However, the voltage of the intermediate DC circuit is often increased greatly by adopting the basic hybrid control method to meet the requirements of field applications, which will generate high rotating speed and low power consumption, resulting in the problem of poor matching of rotating speed and power consumption. Therefore, the utilization rate of power is low for the charging and discharging of the energy storage element, the power of the power pack is not fully utilized, the energy utilization rate is low, and the matching control of the hybrid power cannot be really realized.

SUMMARY OF THE INVENTION

Aiming at the deficiencies of the prior art, the present invention provides a hybrid power locomotive and an energy balance control method and system thereof, so as to solve the problem of adaptive matching between a power pack and an energy storage element.

The present invention solves the above technical problems through the following technical solution: an energy balance control method for a hybrid power locomotive, including:

Step 1: calculating a desired value of a required power of all loads according to a required power of each load;

Step 2: determining an estimated output power of an energy storage element according to the available power and remaining electric quantity of the energy storage element;

Step 3: calculating a power required to be output by a power pack according to the desired value of the required power of all loads obtained in step 1 and the estimated output power of the energy storage element obtained in step 2;

Step 4: calculating a rotating speed of the power pack according to the power required to be output by the power pack, and controlling the power pack to reach the rotating speed;

Step 5: determining a voltage of an intermediate DC (direct-current) circuit according to the rotating speed of the power pack; and Step 6: taking the voltage of the intermediate DC circuit as a target voltage value, comparing an actual output voltage of the power pack with the target voltage value, and if the actual output voltage of the power pack is higher than the target voltage value, charging the energy storage element, otherwise discharging the energy storage element, so that the actual output voltage of the power pack is maintained at the target voltage value.

According to the energy balance control method of the present invention, the rotating speed of the power pack is calculated through the power required to be output by the power pack, and the power pack is operated at the rotating speed, so that the power of the power pack is fully utilized, which improves the efficiency of the power pack under this power: when the actual output voltage of the power pack is higher than the target voltage value, excess energy is stored in the energy storage element, which avoids energy waste while guaranteeing that the power of the power pack is fully utilized; when the actual output voltage of the power pack is lower than the target voltage value, the energy storage element provide energy for the loads, which avoids overload of the power pack. This control method maximizes the energy utilization rate by means of self-adaptive matching of the rotating speed and the power, achieves dynamic balance control over the actual output voltage of the power pack by means of charging and discharging control over the energy storage element, and avoids the waste of energy and the overload of the power pack. This method can be applied to a hybrid power locomotive to play an important role in the operation stability of the locomotive and the energy conservation and environmental protection, so that the hybrid power locomotive is changed to an automatic shift locomotive from the original manual shift locomotive.

Further, in step 1, the desired value of the required power of all loads is equal to the sum of required powers of the loads and a margin.

Further, in step 2, it is assumed that $E_{storage}$ is the remaining electric quantity of the energy storage element. $E_{total}$ is the total electric quantity of the energy storage element. $P_{available}$ is the available power of the energy storage element, and $P_{estimated}$ is the estimated output power of the energy storage element:

When $E_{storage} \geq 70\% \times E_{total}, P_{estimated} = P_{available}$;

When $50\% \times E_{total} \leq E_{storage} < 70\% \times E_{total}, P_{estimated} = 60\% \times P_{available}$;

When $30\% \times E_{total} \leq E_{storage} < 50\% \times E_{total}, P_{estimated} = 20\% \times P_{available}$;

When $10\% \times E_{total} \leq E_{storage} < 30\% \times E_{total}, P_{estimated} = -20\% \times P_{available}$; and When $E_{storage} < 10\% \times E_{total}, P_{estimated} = -60\% \times P_{available}$.

This setting prevents the energy storage element from working at a full power for a long time. When the estimated output power of the energy storage element is negative, it indicates that the energy storage element is desired to be charged rather than discharged.

Further, in step 3, the power required to be output by the power pack is equal to the difference between the desired value of the required power of all loads and the estimated output power of the energy storage element.

Further, in step 5, an output voltage of the power pack, when a rated power of the power pack is output at the rotating speed, is determined according to the rotating speed of the power pack, then the voltage of the intermediate DC circuit is calculated from the voltage when the rated power is output at the rotating speed, and the specific calculation formula is:

$$U_{intermediate} = 1.28 \times U_{rated}$$

Herein, $U_{intermediate}$ is the voltage of the intermediate DC circuit corresponding to the rotating speed of the power pack, and $U_{rated}$ is the output voltage of the power pack when the rated power of the power pack is output at the rotating speed of the power pack.

The present invention further provides an energy balance control system for a hybrid power locomotive, including:

- a load power calculation unit, configured to calculate a desired value of a required power of all loads according to a required power of each load;
- an estimated output power determination unit, configured to determine an estimated output power of an energy storage element according to the available power and remaining electric quantity of the energy storage element;
- a calculation unit for calculating a power required to be output by a power pack, configured to calculate a power required to be output by a power pack according to the desired value of the required power of all loads and the estimated output power of the energy storage element;
- a rotating speed calculation unit, configured to calculate a rotating speed of the power pack according to the power required to be output by the power pack, and control the power pack to reach the rotating speed;
- a voltage determination unit, configured to determine a voltage of an intermediate DC circuit according to the rotating speed of the power pack; and
- a control unit, configured to take the voltage of the intermediate DC circuit as a target voltage value, compare an actual output voltage of the power pack with the target voltage value, and if the actual output voltage of the power pack is higher than the target voltage value, charge the energy storage element, otherwise discharge the energy storage element, so that the actual output voltage of the power pack is maintained at the target voltage value.

The present invention further provides a hybrid power locomotive, including the energy balance control system as described above.

Beneficial effects are as follows:

Compared with the prior art, in the hybrid power locomotive and the energy balance control method and system thereof provided by the present invention, the rotating speed of the power pack is calculated through the power required to be output by the power pack, and the power pack is operated at the rotating speed, so that the power of the power pack is fully utilized, which improves the efficiency of the power pack under this power: when the actual output voltage of the power pack is higher than the target voltage value, excess energy is stored in the energy storage element, which avoids energy waste while guaranteeing that the power of the power pack is fully utilized: when the actual output voltage of the power pack is lower than the target voltage value, the energy storage element provide energy for the loads, which avoids overload of the power pack; this control method maximizes the energy utilization rate by means of self-adaptive matching of the rotating speed and the power, achieves dynamic balance control over the actual output voltage of the power pack by means of charging and discharging control over the energy storage element, and avoids the waste of energy and the overload of the power pack: and this method can be applied to a hybrid power locomotive to play an important role in the operation stability of the locomotive and the energy conservation and environmental protection, so that the hybrid power locomotive is changed to an automatic shift locomotive from the original manual shift locomotive.

BRIEF DESCRIPTION OF THE DRAWINGS

In order to illustrate the technical solutions of the present invention more clearly, the following briefly introduces the accompanying drawings used in the description of the embodiments. Obviously, the drawings in the following description are only an embodiment of the present invention, and those of ordinary skill in the art can obtain other drawings according to the drawings without any creative effort.

DETAILED DESCRIPTION OF THE EMBODIMENTS

Figure 1:
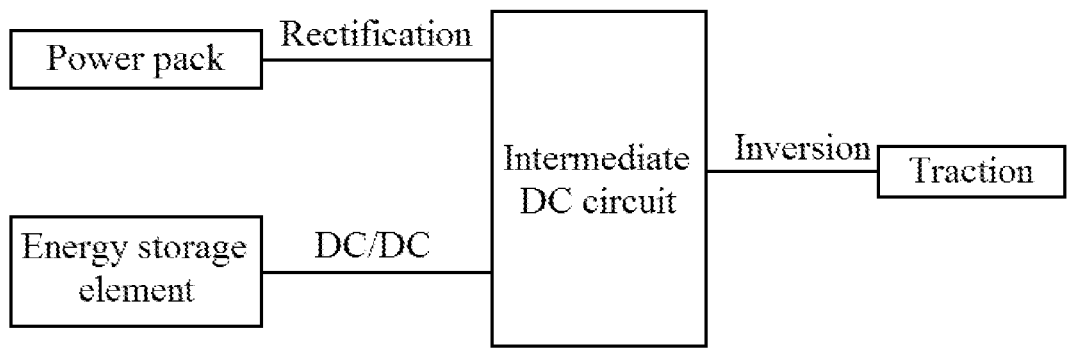
FIG. 1 is a schematic diagram of electrical connection of a hybrid power system of a hybrid power locomotive in the background of the present invention.

A clear and complete description will be made to the technical solutions in the present invention below with reference to the accompanying drawings in the embodiments of the present invention. Apparently, the embodiments described are only part of the embodiments of the present invention, not all of them. All other embodiments obtained by those of ordinary skill in the art based on the embodiments of the present invention without any creative effort shall fall within the protection scope of the present invention.

Embodiment 1

An energy balance control method for a hybrid power locomotive, provided by the present invention, includes.

1. Calculate a desired value of a required power of all loads according to a required power of each load.

The hybrid power locomotive provides traction through a power pack and an energy storage system for the normal operation of the loads to ensure the stable operation of the locomotive. Therefore, the desired value of the required power of all loads is equal to the sum of required powers of the loads and a margin, that is, Desired value of the required power of all the loads=traction power+auxiliary power+locomotive supply power+ . . . +margin  (1)

In this embodiment, the margin is 20 kW.

2. Determine an estimated output power of an energy storage element according to the available power and remaining electric quantity of the energy storage element.

The available power refers to a maximum power that the energy storage element is allowed to output by design, and the estimated output power refers to a power that the energy storage element is estimated to output during operation. The estimated output power is not necessarily full power, but may be part of the full power. In this embodiment, the energy storage element is a battery or a super capacitor.

It is assumed that $E_{storage}$ is the remaining electric quantity of the energy storage element, $E_{total}$ is the total electric quantity of the energy storage element, $P_{available}$ is the available power of the energy storage element, and $P_{estimated}$ is the estimated output power of the energy storage element;

When $E_{storage} \geq 70\% \times E_{total}, P_{estimated} = P_{available}$;

When $50\% \times E_{total} \leq E_{storage} < 70\% \times E_{total}$, $P_{estimate} = 60\% \times P_{available}$;

When $30\% \times E_{total} \leq E_{storage} < 50\% \times E_{total}$, $P_{estimated} = 20\% \times P_{available}$;

When $10\% \times E_{total} \leq E_{storage} < 30\% \times E_{total}, P_{estimated} = -20\% \times P_{available}$; and When $E_{storage} < 10\% \times E_{total}, P_{estimated} = -60\% \times P_{available}$.

The higher the remaining electric quantity of the energy storage element is, the greater the estimated output power that the energy storage element undertakes, and the lower the remaining electric quantity is, the smaller the estimated output power that the energy storage element undertakes. This setting prevents the energy storage element from working at the full power for a long time. When the estimated output power of the energy storage element is negative, it indicates that the energy storage element is desired to be charged rather than discharged. When the estimated output power of the energy storage element is positive, it indicates that the energy storage element can release energy to provide partial traction.

Calculate a power required to be output by a power pack according to the desired value of the required power of all the loads and the estimated output power of the energy storage element. The specific calculation formula is:

$$P_{power} = P_{total} - P_{estimated} \quad (2)$$

Herein, $P_{total}$ is the desired value of the required power of all the loads, and $P_{power}$ is the power required to be output by the power pack.

4. Calculate a rotating speed of the power pack according to the power required to be output by the power pack, and control the power pack to reach the rotating speed, which is the optimal rotating speed. The optimal rotating speed under the power required to be output by the power pack can be calculated according to the relationship between the rotating speed and power of a generator set, so that the working efficiency of the power pack is maximized.

In the traditional control method, due to the limitation of the power pack, the actual output voltage of the power pack changes according to load change. At the same rotating speed, if the power pack can output a rated power corresponding to the optimal rotating speed, the efficiency is the highest. After the actual output voltage of the power pack drops to a certain value, its load is exceeded and the power pack stops abnormally. That is, if the actual output voltage is higher than the voltage when the rated power is output at the optimal rotating speed, the power is not fully utilized, resulting in low efficiency. If the actual output voltage is lower than the voltage when the rated power is output at the optimal rotating speed, the load of the power pack is exceeded and the power pack works at over-load. Only when the actual output voltage is equal to the voltage when the rated power is output at the optimal rotating speed, the power is output most fully without overload. Therefore, the control over the voltage of the intermediate DC circuit is vital.

The rotating speed of the power pack is calculated in real time according to the power required to be output by the power pack, so that the power pack can reach the rotating speed as soon as possible, and the working efficiency of the power pack is improved. Then the voltage of the intermediate DC circuit is determined from the dynamic rotating speed. An optimal rotating speed under different powers required to be output by the power pack can be calculated according to the direct proportion relationship between the power and rotating speed of the power pack, so that the working efficiency of the power pack can be improved.

5. Determine a voltage of an intermediate DC circuit according to the rotating speed of the power pack.

An output voltage of the power pack, when a rated power of the power pack is output at the rotating speed, is determined according to the rotating speed of the power pack, and then the voltage of the intermediate DC circuit is calculated from the voltage when the rated power is output at the rotating speed. The specific calculation formula is:

$$U_{intermediate} = 1.28 \times U_{rated} \quad (3)$$

Herein, $U_{intermediate}$ is the voltage of the intermediate DC circuit corresponding to the rotating speed of the power pack, and $U_{rated}$ is the output voltage of the power pack when the rated power of the power pack is output at the rotating speed of the power pack. In this embodiment, taking an 8-pole permanent magnet generator as an example, the corresponding relationship between the rotating speed and the voltage when the rated power is output at the rotating speed is shown in Table 1. For example, when the rotating speed is 1800 r/min, the voltage when the rated power is output at the rotating speed of 1800 r/min is 645 V.

TABLE 1

Corresponding relationship between rotating speed and voltage when rated power is output at the rotating speed

| | Rotating speed (r/min) | | | | | |
|---|---|---|---|---|---|---|
| | 800 | 1000 | 1200 | 1400 | 1600 | 1800 |
| Voltage (V) | 314 | 380 | 447 | 514 | 578 | 645 |

Figure 2:
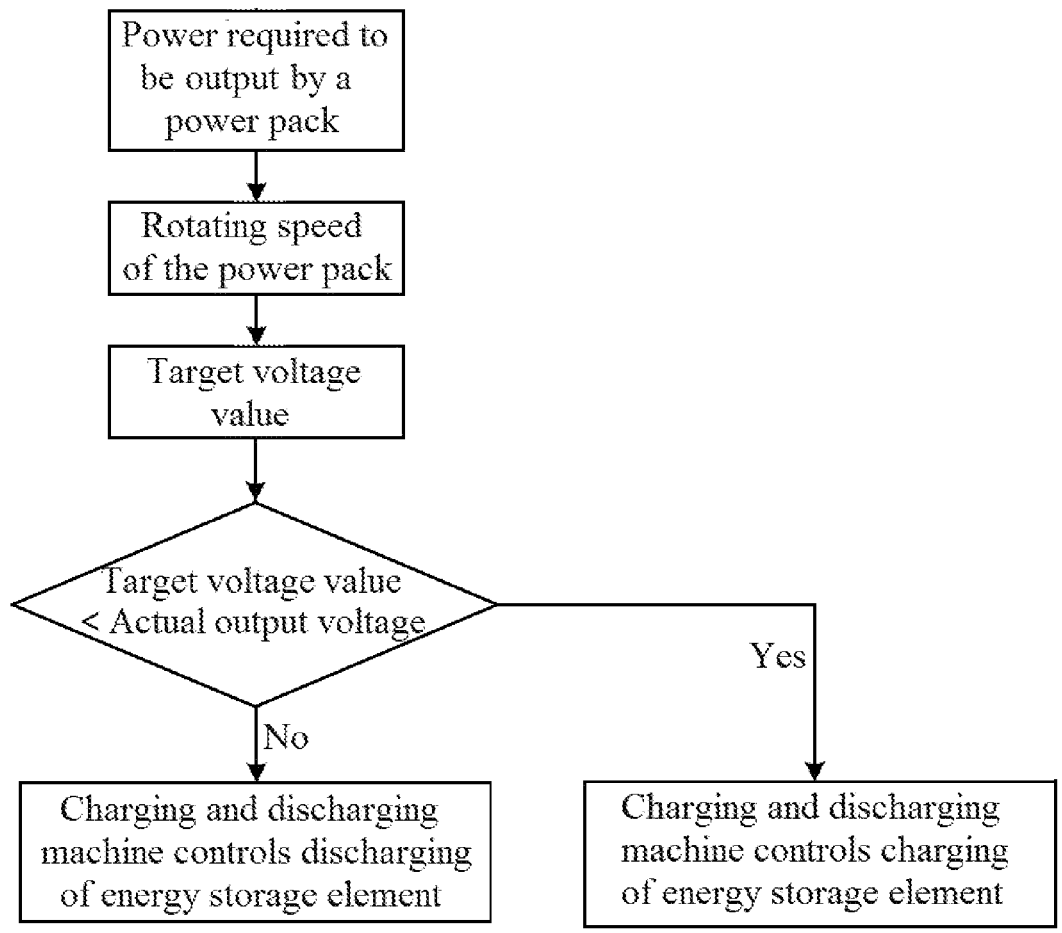
FIG. 2 is a partial control flowchart in an embodiment of the present invention.

6. Take the voltage of the intermediate DC circuit as a target voltage value, compare an actual output voltage of the power pack with the target voltage value, and if the actual output voltage of the power pack is higher than the target voltage value, charge the energy storage element, otherwise discharge the energy storage element, so that the actual output voltage of the power pack is maintained at the target voltage value, as shown in FIG. 2.

The energy storage element can be charged and discharged flexibly. When the actual output voltage of the power pack is higher than the target voltage value, the excessive energy generated by the power pack can be used to charge the energy storage element to avoid energy waste. When the actual output voltage of the power pack is lower than the target voltage value, the energy storage element can be discharged to provide energy to avoid the overload of the power pack. Because the load situation of a vehicle and the overload capacity of the power pack are not exactly the same, the target voltage value can be set with a range. For example, the target voltage value can be equal to the voltage of the intermediate DC circuit f an allowable change value. When the actual output voltage of the power pack is higher than the voltage of the intermediate DC circuit+the allowable change value, the energy storage element is charged. When the actual output voltage of the power pack is lower than the voltage of the intermediate DC circuit−the allowable change value, the energy storage element is discharged. In this embodiment, the allowable change value is 5 V or 10 V.

According to the energy balance control method of the present invention, the rotating speed of the power pack is calculated in real time according to the power required to output by the power pack, and the power pack is operated at the rotating speed, which greatly improves the working efficiency of the power pack. Then the voltage of the intermediate DC circuit is determined through the rotating speed of the power pack, and charging and discharging control over the energy storage element is achieved with the voltage of the intermediate DC circuit as a control target, which not only avoids the waste of energy, but also avoids the overload of the power pack. The rotating speed of the power pack is adjusted in real time by means of the changing desired value of the required power of all loads, so that the rotating speed of the power pack adaptively matches the power required to be output, which guarantees the high working efficiency of the power pack and maximizes the energy utilization rate. Dynamic balance control over the actual output voltage of the power pack is achieved by means of charging and discharging control over the energy storage element, and the waste of energy and the overload of the power pack are avoided. This method can be applied to a hybrid power locomotive to play an important role in the operation stability of the locomotive and the energy conservation and environmental protection, so that the hybrid power locomotive is changed to an automatic shift locomotive from the original manual shift locomotive.

The present invention further provides an energy balance control system for a hybrid power locomotive, including:
- a load power calculation unit, configured to calculate a desired value of a required power of all loads according to the power of each load;
- an estimated output power determination unit, configured to determine an estimated output power of an energy storage element according to the available power and remaining electric quantity of the energy storage element;
- a calculation unit for calculating a power required to be output by a power pack, configured to calculate a power required to be output by a power pack according to the desired value of the required power of all loads and the estimated output power of the energy storage element;
- a rotating speed calculation unit, configured to calculate a rotating speed of the power pack according to the power required to be output by the power pack, and control the power pack to reach the rotating speed;
- a voltage determination unit, configured to determine a voltage of an intermediate DC circuit according to the rotating speed of the power pack; and
- a control unit, configured to take the voltage of the intermediate DC circuit as a target voltage value, compare an actual output voltage of the power pack with the target voltage value, and if the actual output voltage of the power pack is higher than the target voltage value, charge the energy storage element, otherwise discharge the energy storage element, so that the actual output voltage of the power pack is maintained at the target voltage value.

Embodiment 2

(1) Calculate a Desired Value of a Power Required by Loads

It is assumed that the traction power is 200 kW, the auxiliary power is 50 kW, the locomotive supply power is 100 kW, and the margin is 20 kW. According to formula (1), the desired value of the required power of all the loads can be solved as 370 kW.

(2) Determine an Estimated Output Power of an Energy Storage Element

Assuming that the available power of the energy storage element is 250 kW and the remaining electric quantity is 60% of the total electric quantity, the estimated output power of the energy storage element is 150 kW=250 kW×60%.

(3) Calculate a Power Required to be Output by a Power Pack

According to formula (2), the power required to be output by the power pack is 220 kW=200 kW+50 kW+100 kW+20 kW−150 kW.

(4) Determine a Rotating Speed

According to the direct proportion relationship between the rotating speed and the power, the rotating speed corresponding to 220 kW is 1000 r/min.

(5) Determine a Voltage of an Intermediate DC Circuit

According to Table 1, the voltage under the rated working condition when the rotating speed is 1000 r/min is 380 V. According to formula (3), the voltage of the intermediate DC circuit is obtained as 486.4 V.

(6) Control an Energy Storage Element

A target voltage value is set to 486±10 V. When the actual output voltage of the power pack is higher than 496 V, the energy storage element can be charged. When the actual output voltage of the power pack is lower than 476 V, the energy storage element can be discharged to supplement energy and maintain the output voltage of the power pack in the range of 486 f 10 V, which prevents the power pack from overload, maximizes energy utilization and avoids energy waste.

Embodiment 3

(1) Calculate a Desired Value of a Power Required by Loads

It is assumed that the traction power is 100 kW, the auxiliary power is 50 kW, the locomotive supply power is 100 kW, and the margin is 20 kW. According to formula (1), the desired value of the required power of all the loads can be solved as 270 kW.

(2) Determine an Estimated Output Power of an Energy Storage Element

Assuming that the available power of the energy storage element is 250 kW and the remaining electric quantity is 20% of the total electric quantity, the estimated output power of the energy storage element is −50 kW=−20%×250 kW.

(3) Calculate a Power Required to be Output by a Power Pack

According to formula (2), the power required to be output by the power pack is 320 kW=100 kW+50 kW+100 kW+20 kW−(−50 kW).

(4) Determine a Rotating Speed

According to the direct proportion relationship between the rotating speed and the power, the rotating speed corresponding to 320 kW is 1200 r/min.

(5) Determine a Voltage of an Intermediate DC Circuit

According to Table 1, the voltage under the rated working condition when the rotating speed is 1200 r/min is 447 V. According to formula (3), the voltage of the intermediate DC circuit is obtained as 572.1 V.

(6) Control an Energy Storage Element

A target voltage value is set to 572±5 V. When the actual output voltage of the power pack is higher than 577 V, the energy storage element can be charged. When the actual output voltage of the power pack is lower than 567 V, the energy storage element can be discharged to supplement energy and maintain the output voltage of the power pack in the range of 572 t 5 V, which prevents the power pack from overload, maximizes energy utilization and avoids energy waste.

Described above are the specific embodiments of the present invention only, but the protection scope of the present invention is not limited thereto. Any skilled person who is familiar with this art could readily conceive of variations or modifications within the disclosed technical scope of the present invention, and these variations or modifications shall fall within the protection scope of the present invention.

The invention claimed is:

1. An energy balance control method fora hybrid power locomotive, wherein the energy balance control method comprises:
   step 1: calculating a desired value of a required power of all loads according to a required power of each load;
   step 2: determining an estimated output power of an energy storage element according to an available power and remaining electric quantity of the energy storage element;
   step 3: calculating a power required to be output by a power pack according to the desired value of the required power of all loads obtained in step 1 and the estimated output power of the energy storage element obtained in step 2;
   step 4: calculating a rotating speed of the power pack according to the power required to be output by the powerpack, and controlling the power pack to reach the rotating speed;
   step 5: determining a voltage of an intermediate DC circuit according to the rotating speed of the power pack; and
   step 6: taking the voltage of the intermediate DC circuit as a target voltage value, comparing an actual output voltage of the power pack with the target voltage value, and if the actual output voltage of the power pack is higher than the target voltage value, charging the energy storage element, otherwise discharging the energy storage element, so that the actual output voltage of the power pack is maintained at the target voltage value,
   wherein in step 2, it is assumed that $E_{storage}$ is the remaining electric quantity of the energy storage element, $E_{total}$ is a total electric quantity of the energy storage element, $P_{available}$ is the available power of the energy storage element, and $P_{estimated}$ is the estimated output power of the energy storage element;

when $E_{storage} \geq 70\% \times E_{total}, P_{estimated} = P_{available}$;

when $50\% \times E_{total} \leq E_{storage} < 70\% \times E_{total}$, $P_{estimate} = 60\% \times P_{available}$;

when $30\% \times E_{total} \leq E_{storage} < 50\% \times E_{total}$, $P_{estimated} = 20\% \times P_{available}$;

when $10\% \times E_{total} \leq E_{storage} < 30\% \times E_{total}, P_{estimated} = -20\% \times P_{available}$; and when $E_{storage} < 10\% \times E_{total}, P_{estimated} = -60\% \times P_{available}$.

2. The energy balance control method according to claim 1, wherein in step 1, the desired value of the required power of all loads is equal to the sum of required powers of the loads and a margin.

3. The energy balance control method according to claim 1, wherein in step 3, the power required to be output by the power pack is equal to the difference between the desired value of the required power of all loads and the estimated output power of the energy storage element.

4. The energy balance control method according to claim 1, wherein in step 5, an output voltage of the power pack, when a rated power of the power pack is output at the rotating speed, is determined according to the rotating speed of the power pack, then the voltage of the intermediate DC circuit is calculated from the voltage when the rated power is output at the rotating speed, and the specific calculation formula is:

$$U_{intermediate} = 1.28 \times U_{rated}$$

wherein $U_{intermediate}$ is the voltage of the intermediate DC circuit corresponding to the rotating speed of the power pack, and $U_{rated}$ is the output voltage of the power pack when the rated power of the power pack is output at the rotating speed of the power pack.

5. An energy balance control system for a hybrid power locomotive, wherein the energy balance control system comprises:
   a load power calculation unit, configured to calculate a desired value of a required power of all loads according to the power of each load;
   an estimated output power determination unit, configured to determine an estimated output power of an energy storage element according to an available power and a remaining electric quantity of the energy storage element;
   a calculation unit for calculating a power required to be output by a power pack, configured to calculate a power required to be output by a power pack according to the desired value of the required power of all loads and the estimated output power of the energy storage element;
   a rotating speed calculation unit, configured to calculate a rotating speed of the power pack according to the power required to be output by the powerpack, and control the power pack to reach the rotating speed;
   a voltage determination unit, configured to determine a voltage of an intermediate DC circuit according to the rotating speed of the power pack; and
   a control unit, configured to take the voltage of the intermediate DC circuit as a target voltage value, compare an actual output voltage of the power pack with the target voltage value, and if the actual output voltage of the power pack is higher than the target voltage value, charge the energy storage element, otherwise discharge the energy storage element, so that the actual output voltage of the power pack is maintained at the target voltage value, wherein when determining an estimated output power of the energy storage element, it is assumed that $E_{storage}$ is the remaining electric quantity of the energy storage element, $E_{total}$ is a total electric quantity of the energy storage element, $P_{available}$ is the available power of the energy storage element, and $P_{estimated}$ is the estimated output power of the energy storage element;

when $E_{storage} \geq 70\% \times E_{total}$, $P_{estimated} = P_{available}$;

when $50\% \times E_{total} \leq E_{storage} < 70\% \times E_{total}$, $P_{estimate} = 60\% \times P_{available}$;

when $30\% \times E_{total} \leq E_{storage} < 50\% \times E_{total}$, $P_{estimated} = 20\% \times P_{available}$;

when $10\% \times E_{total} \leq E_{storage} < 30\% \times E_{total}$, $P_{estimated} = -20\% \times P_{available}$; and when $E_{storage} < 10\% \times E_{total}$, $P_{estimated} = -60\% \times P_{available}$.

6. A hybrid power locomotive, comprising the energy balance control system according to claim 5.

\* \* \* \* \*